(12) United States Patent
Hirata et al.

(10) Patent No.: US 7,241,015 B2
(45) Date of Patent: Jul. 10, 2007

(54) OPTICAL UNIT AND PROJECTION TYPE IMAGE DISPLAY UNIT USING IT

(75) Inventors: Koji Hirata, Yokohama (JP); Tsutomu Nakashima, Yokohama (JP); Masahiko Yatsu, Fujisawa (JP); Nobuo Masuoka, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 13 days.

(21) Appl. No.: 10/525,514

(22) PCT Filed: Mar. 26, 2004

(86) PCT No.: PCT/JP2004/004321

§ 371 (c)(1),
(2), (4) Date: Sep. 28, 2005

(87) PCT Pub. No.: WO2004/086136

PCT Pub. Date: Oct. 7, 2004

(65) Prior Publication Data

US 2006/0126020 A1 Jun. 15, 2006

(30) Foreign Application Priority Data

Mar. 27, 2003 (JP) .............................. 2003-086909

(51) Int. Cl.
*G03B 21/00* (2006.01)
*G03B 21/14* (2006.01)
*G03B 21/22* (2006.01)

(52) U.S. Cl. .............................. 353/20; 353/22; 353/31; 353/119

(58) Field of Classification Search ............... 353/20, 353/31, 98, 119, 22; 349/9

See application file for complete search history.

(56) References Cited

U.S. PATENT DOCUMENTS

| 4,733,065 A | 3/1988 | Hoshi et al. |
| 6,183,090 B1 | 2/2001 | Nakanishi et al. |
| 6,243,199 B1 | 6/2001 | Hansen et al. |
| 2002/0122235 A1 | 9/2002 | Kurtz et al. |
| 2003/0081317 A1 | 5/2003 | Katsumata et al. |
| 2003/0098944 A1 | 5/2003 | Numata et al. |

FOREIGN PATENT DOCUMENTS

| JP | 61-017103 | 1/1986 |
| JP | 05-288902 | 11/1993 |
| JP | 11-015074 | 1/1999 |
| JP | 11-160854 | 6/1999 |
| JP | 11-183885 | 7/1999 |
| JP | 11-202432 | 7/1999 |
| JP | 11-249070 | 9/1999 |
| JP | 2001-142028 | 5/2001 |
| JP | 2003-195223 | 7/2003 |
| JP | 2003-328234 | 11/2003 |
| WO | WO 01/18570 A1 | 3/2000 |

*Primary Examiner*—Melissa Jan Koval
(74) *Attorney, Agent, or Firm*—Antonelli, Terry, Stout & Kraus, LLP.

(57) ABSTRACT

An optical unit includes a light source, a color separator, reflection-type image display elements, a color synthesizer, a reflection-type polarization plate, and an optical chassis. The optical chassis holds the reflection-type polarization plate and the reflection-type image display elements thereon, and has a translucent window on an incident light side of the reflection-type polarization plate while an exiting light side of the reflection-type polarization plate is sealed with an incident surface of the color synthesizer. A hermetically sealed space is defined by the optical chassis, the reflection-type image display elements and the incident surface of the color synthesizer, and within the hermetically sealed space is disposed a translucent liquid having a refraction index from 1.2 to 1.9.

8 Claims, 6 Drawing Sheets

OPTICAL UNIT AND PROJECTION TYPE IMAGE DISPLAY UNIT USING IT

TECHNICAL FIELD

The present invention relates to an optical unit and a projection-type image display apparatus using the same, in which a light emitted from a light source is incident upon a reflection-type image display element(s), thereby projecting the light which is/are reflected upon the said reflection-type image display element(s), enlargedly.

BACKGROUND OF THE INVENTION

Conventionally are already known a projection-type image display apparatus, which mounts an optical unit for modulating an intensity of light emitted from a light source through an image display element(s); i.e., the gradation is changed depending upon an image signal, thereby forming an optical image, and projecting that optical image, enlargedly, by means of a projection lens. And, as such the image display element, there are already known a transmitting-type liquid crystal panel, a reflection-type liquid crystal panel, and a micro mirror panel, and so on.

Among of those mentioned above, within the optical units of using the reflection-type liquid crystal panel(s), there is applied a polarization beam splitter (hereinafter, being called as "PBS") prism, functioning as a polarizer and an analyzer in common, as is described in FIG. 12 of Patent Document 1 (Japanese Patent Laying-Open No. 2001-142028 (2001), for example. Within this, the light emitted from the light source is uniformed or aligned into a predetermined direction in polarization direction, by means of a polarization light conversion element, to be incident upon the PBS prism. The incident light is reflected upon a PBS film surface thereof, to be incident upon the reflection-type liquid crystal panel. The light incident upon the reflection-type liquid crystal panel is modulated in the polarization condition for each pixel depending upon the image signal. The light reflected upon the reflection-type liquid crystal panel is incident upon the PBS prism, again, so that only the light modulated in the polarization condition can pass through; thereby being projected, enlargedly, by means of that projection lens.

However, with this technology, a ¼ wavelength plate is necessary for lessoning a leakage light, which is caused when an oblique or inclined light is incident upon the PBS prism, not being parallel with a surface (a main incident surface) thereof, which is defined by an optical axis and the PBS film surface. However, because of an incompleteness of the effect thereof, there is still a drawback that contrast cannot be enhanced.

Then, in Non-Patent Document 1, i.e., "Optical Flat Polarizing Beamsplitters": Moxtech Co., U.S.A., a catalogue No. PBF02A (May 2002), there is introduced an example of applying the reflection-type polarization plate, as the polarizer and the analyzer, in common, reflecting a light polarized in parallel to the direction of grating, while transmitting a light polarized in orthogonal to that direction of grating, due to diffraction of the optical grating thereof.

DISCLOSURE OF THE INVENTION

Though applying a color wheel as a means for displaying a color image in the Non-Patent Document 1 mentioned above, however in this case, a loss in an amount of light when it passes through the color wheel comes up to about ⅔; i.e., being low in an efficiency of utilizing light, and therefore, it is impossible to obtain a sufficient brightness, unless applying a lamp of a high output therein. Also, since the reflection-type polarization plate is applied to be an auxiliary analyzer, there is a possibility of generating a ghost image therein. Further, it cannot said that the contrast is sufficient enough, and therefore, there is a necessity of further improvement thereof.

Then, the same applicant has already invented an optical unit of applying the reflection-type image display element therein, to be used in the projection-type image display apparatus, being small-sized and light-weighted, and also being favorable in a picture quality and performances thereof, such as, the brightness, the contrast, and the resolution, etc., and it was filed as an application; i.e., Japanese Patent Application No. 2002-226806 (2002). Hereinafter, explanation will be made about that optical unit.

FIG. 8 is a drawing for showing that optical unit.

In FIG. 8, a reference numeral 1 depicts a light source, 2 an optical axis of the optical unit, and 3 a rod lens having a function of an integrator and being equipped with a conversion operation or function of a polarization light. Reference numerals 41, 42 and 43 are image-forming lenses for irradiating an image formed at an exit opening of the rod lens 3, upon reflection-type liquid crystal panels 111, 112 and 113, respectively. A reference numeral 5 depicts a white-colored reflection mirror, 6 a dichroic mirror of transmitting blue (B) light while reflecting red (R) and green (G) lights (i.e., a B-passing and R, G-reflecting dichroic mirror), 7 a R-passing G-reflecting dichroic mirror, 8 a B-reflecting mirror, 91, 92 and 93 auxiliary polarizers of absorption-type or reflection-type, to be used for R-light, G-light, and B-light, respectively, 101', 102' and 103' reflection-type polarization plates, each using a diffraction grating therein, for R, G and B-lights, wherein hatched portions in the figure depict working surfaces thereof. Reference numerals 111, 112 and 113 depict reflection-type liquid crystal panels for use of R, G and B-lights, and 121, 122 and 123 auxiliary analyzers of absorption-type for use of R, G and B-lights, respectively. A reference numeral 132 is a ½ wavelength plate for use of G-light, 14 a cross-dichroic prism, and 15 a projection lens. Herein, each of those auxiliary polarizers 91, 92 and 93 and also those auxiliary analyzers 121, 122 and 123 is disposed or formed on a substrate made from a transparent flat plate. Also, herein "R" means a red color, "G" a green color, and "B" a blue color, respectively.

In FIG. 8, the light emitted from the light source 1 is condensed, and it transmits or propagates within an inside of the rod lens 3. In this instance, since the rod lens has a function of the integrator, the light emitted therefrom comes to be uniform within a surface thereupon. Further, since the rod lens is also equipped with a function of the polarization light conversion, but not shown in the figure, then the light emitted therefrom is aligned into the P-polarization light in polarization direction. The light emitted from the rod lens 3, passing through the image forming lens 41, is bent by 90° in the direction of a light ray by means of the white-colored reflection mirror 5, to be incident upon the B-pass and R, G-reflect dichroic mirror 6, so that the B-light passes therethrough while the R and G-lights reflected thereupon. The reflected R and G-lights pass through the image-forming lens 42, and then by means of the R-pass G-reflect dichroic mirror 7, the R-light passes therethrough while the G-light is reflected thereupon.

The R-light passing through the R-pass and G-reflect dichroic mirror 7 is incident upon the R-use auxiliary polarizer 91. The light having the polarization direction, being orthogonal or perpendicular to an absorption axis or a reflection axis of the R-use auxiliary polarizer 91 (herein, the P-polarization light), passes through the R-use auxiliary polarizer 91, to be incident upon the R-use reflection-type polarization plate 101'. Since the R-use reflection-type polarization plate 101', applying the diffraction grating therein, is so disposed that the reflection axis parallel to the grating direction comes to be in nearly parallel to the absorption axis or the reflection axis of the R-use auxiliary polarizer 91; therefore, the light incident upon the R-use reflection-type polarization plate 101' passes therethrough, to be incident upon the R-use reflection-type liquid crystal panel 111.

The G-light reflected upon the R-pass and G-reflect dichroic mirror 7 is incident upon the G-use auxiliary polarizer 92. In the similar manner to the R-light, the light having the polarization direction perpendicular to the absorption axis or the reflection axis of the G use auxiliary polarizer 92 (herein, the P-polarization light) passes through the G-use auxiliary polarizer 92, to be incident upon the G-use reflection-type polarization plate 102'. Since the G-use reflection-type polarization plate 102', applying the diffraction grating therein, is so disposed that the reflection axis parallel to the grating direction thereof comes to be in nearly parallel to the absorption axis or the reflection axis of the G-use auxiliary polarizer 92; therefore, the light incident upon the G-use reflection-type polarization plate 102' passes therethrough, to be incident upon the G-use reflection-type liquid crystal panel 112.

The B-light reflected upon the B-pass R, G-reflect dichroic mirror 6 passes through the image formation lens 43, and it is bent by 90° in the direction of light ray, by means of the B-reflection mirror 8, to be incident upon the B-use auxiliary polarizer 93. Herein, differing from those of the R and G-lights, the length of a light path of the B-light is long; therefore, the B-light makes up an image upon the B-use reflection-type liquid crystal panel 113 with provision of relay lenses 44 and 45 on the B-light path. With the light incident upon the B-use auxiliary polarizer 93, the light having the polarization direction perpendicular to the absorption axis or the reflection axis of the B-use auxiliary polarizer 93 (herein, the P-polarization light) passes through that B-use auxiliary polarizer 93, to be incident upon the B-use reflection-type polarization plate 103'. Since the B-use reflection-type polarization plate 103', applying the diffraction grating therein, is so disposed that the reflection axis parallel to the grating direction thereof comes to be in nearly parallel to the absorption axis or the reflection axis of the B-use auxiliary polarizer 93; therefore, the light incident upon the B-use reflection-type polarization plate 103' passes therethrough, to be incident upon the B-use reflection-type liquid crystal panel 113. In this manner, the light is divided into R, G and B-lights.

The lights incident upon the R-use reflection-type liquid crystal panel 111, the G-use reflection-type liquid crystal panel 112 and the B-use reflection-type liquid crystal panel 113 are rotated by 90° in polarization into the S-polarization, respectively, when they are reflected upon the respective pixels of the R-use reflection-type liquid crystal panel 111, the G-use reflection-type liquid crystal panel 112 and the B-use reflection-type liquid crystal panel 113, each displaying a white image, and they are incident upon the R-use reflection-type polarization plate 101', the G-use reflection-type polarization plate 102' and the B-use reflection-type polarization plate 103'. In this instance, the incident lights are the S-polarization lights, being parallel to the reflection axis; therefore, they are reflected upon the R-use reflection-type polarization plate 101', the G-use reflection-type polarization plate 102' and the B-use reflection-type polarization plate 103', to be bent by 90° in the direction of light beam, and are incident upon the R-use auxiliary analyzer 121, the G-use auxiliary analyzer 122 and the B-use auxiliary analyzer 123, respectively. The absorption axes of those auxiliary analyzers 121, 122, and 123 are so disposed that they come to be in nearly perpendicular to the reflection axes of the R-use reflection-type polarization plate 101', the G-use reflection-type polarization plate 102' and the B-use reflection-type polarization plate 103'; therefore, the lights reflected upon the reflection-type polarization plates 101', 102' and 103' pass through the auxiliary analyzers 121, 122, and 123, wherein the R and B-lights are in the S-polarization, as they are, while the G-light is turned into the P-polarization after passing through the G-use ½ wavelength plate 132, and all the R, G and B-lights are incident upon the cross dichroic prism 14. The R, G and B-lights are composed or synthesized into a white color, by means of the cross dichroic prism 14, and are enlargedly projected onto a screen (not shown in the figure) through the projection lens 15. In the optical unit described in the Patent Document 1 mentioned above, a polarization beam splitter prism (hereinafter, being called as a "PBS prism") is applied to the polarizers and the analyzers thereof. The PBS prism, being relatively cheap, has multi-layer film surfaces of dielectric, and it transmits the P-polarization light therethrough, but reflecting the S-polarization light thereupon, on the film surface (hereinafter, being called as a "PBS film"). Within the optical unit applying such the PBS prism therein, for the purpose of enhancement of the contrast, it is necessary to lessen the light leaking from the PBS prism when displaying a black image, and therefore, for that purpose, the ¼ wavelength plate is necessary. However, if applying the ¼ wavelength plate, the effect thereof is not complete. This is because the ¼ wavelength plate has a wavelength characteristic and an angle characteristic; i.e., the further the wavelength of the incident light separating from the designed central wavelength, or the larger the incident angle thereof, the lesser the function thereof. Accordingly, within the optical unit, wherein the lights incident upon the reflection-type liquid crystal panels have a certain wavelength region and a certain angular region, the effect is not complete of lessening the leakage light to all of the incident lights.

On the contrary thereto, each of the reflection-type polarization plates 101', 102' and 103' has a grating function into a specific direction, thereby functioning as to be the polarization plate; i.e., it reflects the polarization light parallel to the grating direction while transmitting the polarization light perpendicular thereto. Also, each of the reflection-type polarization plates 101', 102' and 103' shows a performance of separating the polarization lights at the most, when the reflection axis thereof is disposed to be in parallel to a normal line upon the surface, which includes an optical axis and a normal line of the reflection-type polarization plate thereon. In other words, a degree of polarization of the polarization plate comes up to the highest, in particular, to the penetration light and the reflection light, when it is used in such a manner that the reflection axis is disposed to be in parallel to the direction of the S-polarization to the light beam-on the optical axis; i.e., reflecting the S-polarization light while transmitting the P-polarization light of the light beam on the optical axis. Accordingly, the polarization plates are disposed in such the manner as was mentioned in the present structures thereof.

The reflection-type polarization plate reflects the light polarized to be parallel to the grating direction while transmitting the light polarized to be perpendicular to that, however, actually, it also transmits the light polarized to be parallel to the grating direction, but a very small amount thereof, and it also reflects the light polarized to be perpendicular to the grating direction, but a very small amount thereof; thereby lowering or reducing the contrast. Then, the auxiliary polarizers 91, 92 and 93 are provided at the inlet side while the auxiliary analyzers 121, 122 and 123 are at the exit side, so as to lessen the leakage lights when displaying the block; thereby obtaining an optical unit being favorable on the performance of contrast.

Also, the auxiliary analyzers 121, 122 and 123 are of the absorption-type; therefore, it is possible to suppress or restrain generation of the ghost image.

Next, explanation will be made about the problems of the optical unit mentioned above.

As is apparent from FIG. 8, since spaces on the optical path, starting from each of the reflection-type liquid crystal panels 111, 112 and 113 reaching to the cross dichroic prism 14, are filled up with an air, within the optical unit of applying the reflection-type polarization plates 101', 102' and 103' therein, then the optical length (being called by "back focus") is long, from the lens within the projection lens, which is provided on the side of the cross dichroic prism, up to each of the reflection-type liquid crystal panels 111, 112 and 113. For this reason, the projection lens comes to be large in the size, and thereby bringing about a problem of being disadvantageous to achieve small-sizing and light-weighting of the optical unit.

Also, a high resolution is demanded for enabling or dealing with HD (i.e., a high definition) of the apparatus, and so on, and because of this, each of the pixels on the liquid crystal panel also comes to be small in the size thereof. For example, in the case of the panel of 0.7 inch WXGA (1,368×768) on a mainstream of the products, the pixel pitch is about 15 μm, for example, but in the case of the panel of the same size, i.e., 0.7 inch, enabling 1080HD (1,920×1,080), the pixel pitch is about 8 μm, i.e., about a half thereof. Also an allowable value (hereinafter, being called "convergence shift") comes to be about a half, in the positional gap of the each reflection-type liquid crystal panel 111, 112 or 113. On the other hand, so as to increase an output of a lamp and further to obtain high efficiency of a lightening optical system thereof, for the purpose of achieving the high brightness of the apparatus, the light energy irradiated upon the panels also comes up to be large, and also an increase of temperature comes to be large. When the temperature rises up, holder members for holding the reflection-type liquid crystal panel 111, 112 and 113 expand thermally, to shift the position of each of the reflection-type liquid crystal panel 111, 112 and 113; thereby, bringing about a problem that the convergence gap is generated, easily.

Further, comparing to that in the conventional art, since the light energy irradiated upon each of optical parts comes up to be large, an increase of temperature also comes to be large, upon the reflection-type liquid crystal panels, the reflection-type polarization plate, the auxiliary polarizers and the auxiliary analyzers, in particular, and therefore, they are cooled down by means of a fan, so as to stop each of the optical part from rise-up in the temperature thereof, but by a certain degree. Namely, the open air taken by the fan into the apparatus is guided to hit upon the each of the optical parts, thereby achieving the cooling thereof. At a suction inlet there is attached a filter, however it is impossible to remove dust (dirt or particles) therefrom, completely; therefore, there is also other problem, that the dust adheres upon the surface of the optical parts. Further, if enlarging an amount of air flow, by increasing the number of the fans or large-sizing of the fan, but it also brings about a demerit that noises generated therefrom come to be large.

An object according to the present invention, by taking such the problems mentioned above into the consideration thereof, is to provide an optical unit and a projection-type image display apparatus using the same therein, for achieving a small-size and light-weight thereof.

For dissolving the problems mentioned above, according to the present invention, first there is provided an optical unit, comprising: a light source; a color separation means for separating a light emitted from said light source into plural pieces of color lights; reflection-type image display elements, each being incident the corresponding color of the lights from said color separation means, and for forming an optical image for each of said color lights, depending upon an image signal, with using polarization characteristics which said reflection-type image display elements have; and a color synthesizing means for synthesizing said optical images of said respective color lights, to be projected through a projection lens, enlargedly, and further comprising: a reflection-type polarization plate functioning as a polarization plate due to diffraction, being provided on an optical path extending from said color separation means to said reflection-type image display elements, to be a polarizer and an analyzer to said reflection-type image display elements; and an optical chassis for holding said reflection-type polarization plate and said reflection-type image display elements thereon, and having a translucent window on an incident light side of said reflection-type polarization plate while an exiting light side of said reflection-type polarization plate is sealed with an incident surface of said color synthesizing means, wherein a hermetically sealed space is defined by said optical chassis, said reflection-type image display elements and the incident surface of said color synthesizing means, and within said hermetically sealed space is disposed a translucent liquid having refraction index from 1.2 to 1.9.

According to the present invention, in a case where it is impossible to keep a predetermined contrast since the characteristics as a polarizer and an analyzer of said reflection-type polarizing plate are insufficient, then an auxiliary polarizer may be disposed on an incident side of said reflection-type polarization plate, and an auxiliary analyzer on an exit side thereof. In this case, the auxiliary polarizer is disposed on said optical chassis in place of said incident light side translucent window, while the auxiliary analyzer is on the incident surface of said color separation means.

In this manner, the said optical units (i.e., the auxiliary analyzer, the reflection-type polarizing plate, reflection-type liquid crystal panels, the auxiliary analyzer, and the color separation means) are disposed within said hermetically sealed space; therefore, it is possible to preventing dust from adhering thereon. Also, said hermetically sealed space is filled up with the translucent liquid, having refraction index being small in the difference between said optical parts; therefore, it is possible to shorten an optical length of the optical path from said reflection-type image display element through said reflection-type polarization plate to said color separation means, comparing to that in the case of a medium of an air, thereby enabling small-sizing of said projection lens. And, it is also possible to reduce the reflections upon the boundary surfaces of said optical parts; therefore, there is no necessity of treating an anti reflection upon said optical parts, so that the cost can be lowered down. Further, said translucent liquid also functions as a cooling medium therein; therefore, it is possible to reduce the convergence shift. And further, it is possible to remove a fan for cooling or to lower the rotational speed thereof; therefore, the noises generated by the fan can be reduced.

As was explained in the above, according to the present invention, it is possible to achieve the projection-type image display apparatus, being small in the size and light in the weight thereof.

BEST MODE FOR CARRYING OUT THE INVENTION

Hereinafter, embodiments according to the present invention will be fully explained by referring to the attached drawings.

Figure 1A:
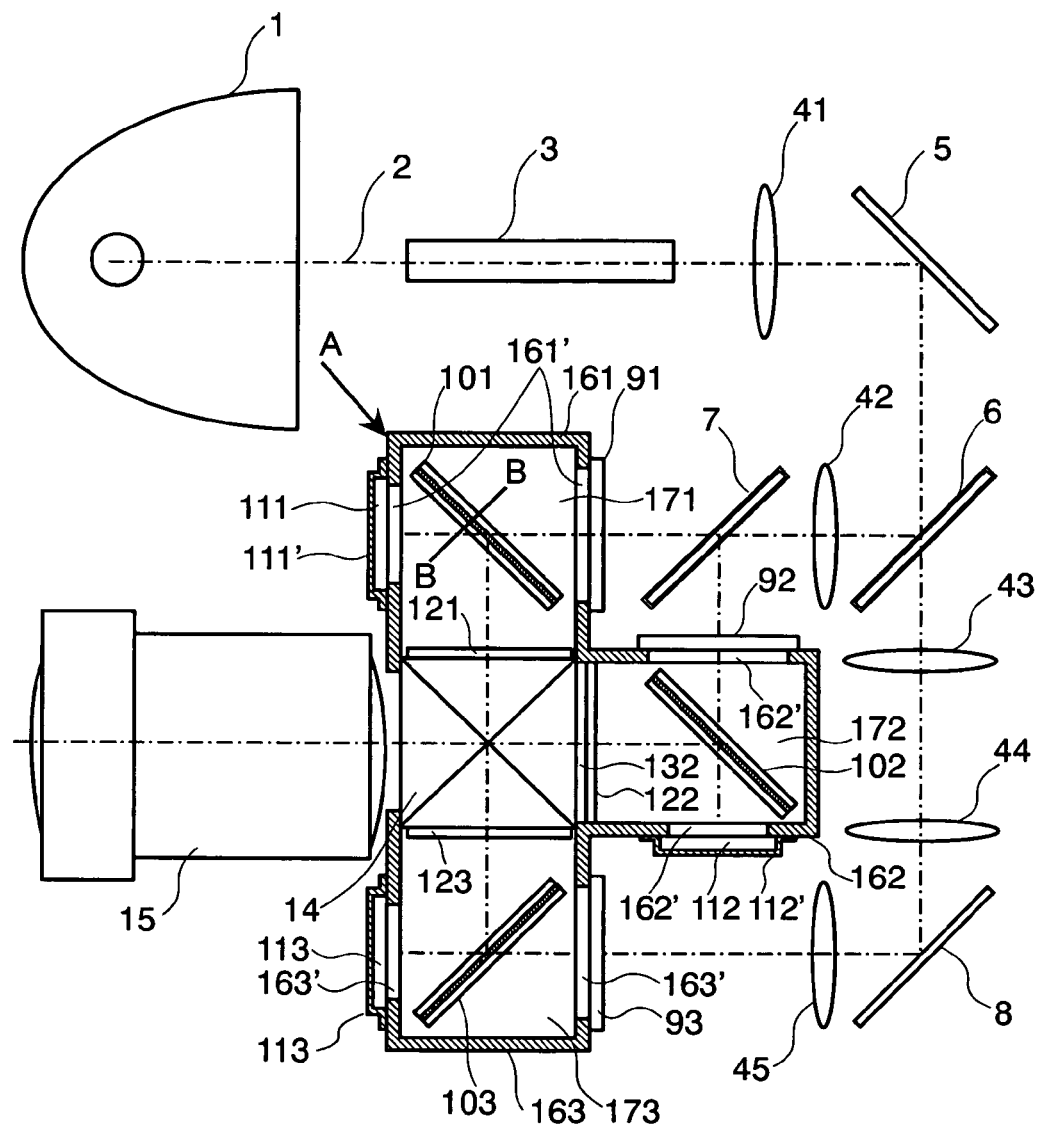
FIG. 1(a) is a plane view of showing an optical unit and FIG. 1(b) a part thereof, according to a first embodiment of the present invention.
Figure 1B:
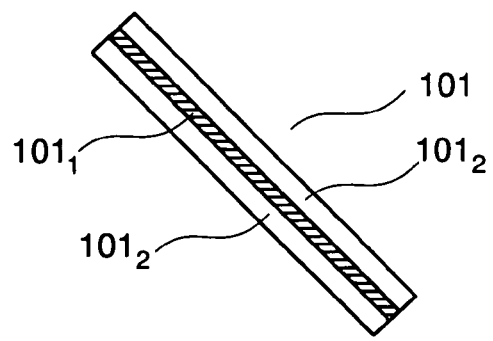
Figure 2:
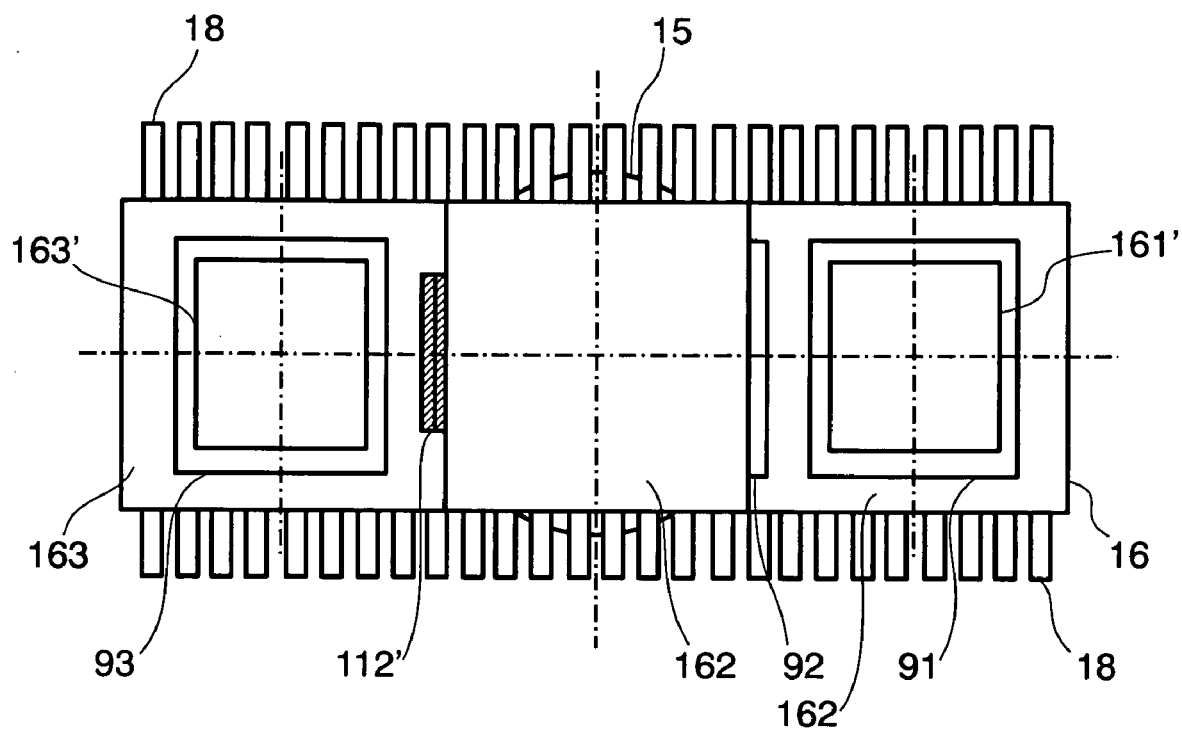
FIG. 2 is a side view of an optical chassis portion of the optical unit according to the first embodiment of the present invention.

FIGS. 1(a) and 1(b) are views for showing a first embodiment of an optical unit and a part thereof, according to the present invention, and FIG. 2 is a side view of an optical chassis portion shown in FIG. 1(a). However, FIG. 1(a) is a plane view of the optical unit, and FIG. 1(b) an enlarged structure view of a reflection-type polarization plate. Further, in those FIGS. 1(a) and 1(b) and FIG. 2, elements having the same functions to those shown in FIG. 8 mentioned above are attached with the same reference numerals thereof, and therefore the explanations thereabout will be omitted herein.

In those FIGS. 1(a) and 1(b) and FIG. 2, reference numerals 161, 162 and 163 depict a R-use optical chassis, a G-use optical chassis and a B-use optical chassis, respectively; 101, 102 and 103 a R-use reflection-type polarization plate, a G-use reflection-type polarization plate and a B-use reflection-type polarization plate, respectively, each applying a refraction grating therein; and further 171, 172 and 173 a R-use translucent liquid, a G-use translucent liquid and a B-use translucent liquid, respectively. And a reference numeral 18 depicts a heat radiation fin.

The R-use reflection-type polarization plate 101 has a sandwich structure, as shown in FIG. 1(b), i.e., putting a working surface (a hatching portion) $101_1$, upon which the diffraction grating is formed, between transparent members $101_2$, while filling up with an optical adhesive in an inside thereof (not shown in the figure), so that no air layer lies therein. Or alternatively, it may has such the structure that, after forming the diffraction grating on a transparent member, as the working surface, a transparent coating is provided upon that working surface for protecting the working surface (not shown in the figure).

The G-use reflection-type polarization plate 102 and the B-use reflection-type polarization plate 103 are also constructed in the similar manner.

Within the optical unit according to the present invention, a hermetically sealed space is built up with the R-use auxiliary polarizer 91, a liquid crystal panel surface of the R-use reflection-type liquid crystal panel 111, an incident surface of the cross dichroic prism 14 attached with the R-use auxiliary analyzer 121, and the R-use optical chassis 161.

Hereinafter, a region of an optical path for the R-light emitted from the R-use auxiliary polarizer 91 up to the incident surface of the cross dichroic prism 14 is called by a "R-light block", for convenience of explanation. This is also same to "G-light block" and "B-light block".

At inlet and outlet (or, light incident and exit) openings for a light of the R-use optical chassis 161, there are provided R-use passages (or, R-use translucent windows) 161', for transmitting the light therethrough. And, those R-use passages 161' are covered with the R-use auxiliary polarizer 91 and the R-use reflection-type liquid crystal panel 111, respectively, while putting an elastic body, such as, an "O" ring, etc. (not shown in the figure), between the R-use auxiliary polarizer 91, the R-use reflection-type liquid crystal panel 111 or the incident surface of the cross dichroic prism 14, and the R-use optical chassis 161, thereby suppressing the elastic body there between for sealing. Further, the R-use passage 161', which is covered with the R-use auxiliary polarizer 91, is provided at the light inlet side of the R-use reflection-type polarization plate 101. Also, the R-use passage 161', which covers the reflection-type liquid crystal panel 111, is provided at light incident-and-exit side of the R-use reflection-type polarization plate 101.

The reflection-type liquid crystal panel 111 is held by a R-use holding member 111' onto the R-use optical chassis 161, and in the similar manner, the R-use auxiliary polarizer 91 is also held by a holing member not shown in the figure.

Figure 3:
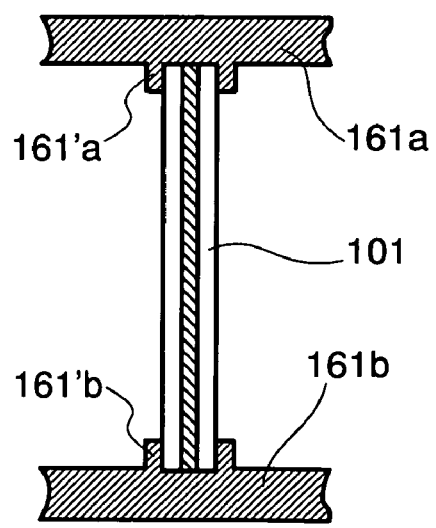
FIG. 3 is a view for showing one embodiment of a holing mechanism of a R-use reflection-type polarization plate.

And, the R-use reflection-type polarization plate 101, which is provided within the above-mentioned space hermetically sealed up, is also held onto the R-use optical chassis 161. FIG. 3 is a view for showing an embodiment of the holding mechanism for the R-use reflection-type polarization plate, and it is B–B' cross-section view of cutting the R-light block shown in FIG. 1(a), along a B–B' line in the vicinity of the R-use reflection-type polarization plate 101, seen from a "A" direction. In this FIG. 3, the R-use reflection-type polarization plate 101 is held by grooves 161'a and 161'b, which are provided in an upper surface member 161a and a bottom surface member 161b of the R-use optical chassis 161, respectively.

In the similar manner, the hermetically sealed spaces are built up at the sides of the G-light block and the B-light block. Namely, at the side of the G-light block, the hermetically sealed space is built up with the G-use auxiliary polarizer 92, the liquid crystal panel surface of the G-use reflection-type liquid crystal panel 112, the incident surface of the cross dichroic prism 14 attached with the G-use auxiliary analyzer 122 and the G-use ½ wavelength plate 132, and the G-use optical chassis 162. At the inlet and outlet openings for a light of the G-use optical chassis 162, there are provided G-use passage openings (or G-use translucent windows) 162' for transmitting the light therethrough, in the similar manner to that in the R-use optical chassis 161. And those G-use passage openings 162' are covered with the G-use auxiliary polarizer 92 and the G-use reflection-type liquid crystal panel 112, respectively, while putting an elastic body, such as, an "O" ring, etc. (not shown in the figure), between the G-use auxiliary polarizer 92, the G-use reflection-type liquid crystal panel 112 or the incident surface of the cross dichroic prism 14, and the G-use optical chassis 162, thereby suppressing the elastic body therebetween for sealing.

The G-use reflection-type liquid crystal panel 112 is held by a G-use holding member 112' onto the G-use optical chassis 162, and in the similar manner, the G-use auxiliary polarizer 92 is also held by a holing member, but not shown in the figure. And, the G-use reflection-type polarization plate 102, which is provided within the above-mentioned space hermetically sealed up, is also held onto the G-use optical chassis 162, but the explanation thereof will be omitted herein.

In the similar manner, at the side of the B-light block, the hermetically sealed space is built up with the B-use auxiliary polarizer 93, the liquid crystal panel surface of the B-use reflection-type liquid crystal panel 113, the incident surface of the cross dichroic prism 14 attached with the B-use auxiliary analyzer 123, and the B-use optical chassis 163. At the inlet and outlet openings for a light of the B-use optical chassis 163, there are provided B-use passage openings (or B-use translucent windows) 163' for transmitting the light therethrough, in the similar manner to that in the R-use optical chassis 161 and the G-use optical chassis 162. And those B-use passage openings 162' are covered with the B-use auxiliary polarizer 93 and the B-use reflection-type liquid crystal panel 113, respectively, while putting an elastic body, such as, an "O" ring, etc. (not shown in the figure), between the B-use auxiliary polarizer 93, the B-use reflection-type liquid crystal panel 113 or the incident surface of the cross dichroic prism 14, and the B-use optical chassis 163, thereby suppressing the elastic body therebetween for sealing.

The B-use reflection-type-liquid crystal panel 113 is held by a B-use holding member 113' onto the B-use optical chassis 163, and in the similar manner, the B-use auxiliary polarizer 93 is also held by a holing member, but not shown in the figure. And, the B-use reflection-type polarization plate 103, which is provided within the above-mentioned space hermetically sealed up, is also held onto the B-use optical chassis 163, in the similar manner to that of the side of the G-light block, but the explanation thereof will be omitted herein.

On those incident surfaces of the cross dichroic prism are attached the R-use auxiliary analyzer 121, the G-use auxiliary analyzer 122 and the ½ wavelength plate 132, and the B-use auxiliary analyzer 123, respectively, and they build up the above-mentioned hermetically sealed spaces, respectively, with each the optical chassis; i.e., the R-use optical chassis 161, the G-use optical chassis 162 and the B-use optical chassis 163, on each of the incident surfaces of the cross dichroic prism 14. Namely, each of the incident surfaces of the cross dichroic prism 14 builds up a wall surface of the each optical chassis.

As was mentioned above, within the space hermetically sealed up are disposed the auxiliary polarizers 91, 92 and 93, the reflection-type polarization plates 101, 102 and 103, the reflection-type liquid crystal panels 111, 112 and 113, and the auxiliary analyzers 121, 122 and 123 (hereinafter, those will be mentioned by "optical parts", generally or collectively, for convenience of the explanation thereof); therefore, no dust can enters into, from an outside thereof, and it is possible to protect the optical parts mentioned above from adhesion of the dust thereupon.

Further, within each of the spaces, which are hermetically sealed up, i.e., the R-use optical chassis 161, the G-use optical chassis 162 and the B-use optical chassis 163, each also being hermetically sealed up, there are filled up with a R-use translucent liquid 171, a G-use translucent liquid 172 and a B-use translucent liquid 1731, respectively, each having a refractive index, being equal or greater than 1.2 and equal or less than 1.9. With this, the optical path from the R-use reflection-type liquid crystal panel 111 through the R-use reflection-type polarization plate 101 to the R-use auxiliary analyzer 121 lies within the R-use translucent liquid 171 mentioned above, the optical path from the G-use reflection-type liquid crystal panel 112 through the G-use reflection-type polarization plate 102 to the G-use auxiliary analyzer 122 lies within the R-use translucent liquid 172 mentioned above, and further the optical path from the B-use reflection-type liquid crystal panel 113 through the B-use reflection-type polarization plate 103 to the B-use auxiliary analyzer 123 lies within the B-use translucent liquid 173 mentioned above, respectively. Accordingly, the optical length of each of those optical paths comes to be small; i.e., (the optical length)=(the optical length in case of the air of FIG. 8)/(refraction index of the translucent liquid 171, 172 or 173). Therefore, the back focus can be made to be small comparing to the case of the air in FIG. 8, and thereby enabling small-sizing of the projection lens 15.

As the R-use translucent liquid 171, the G-use translucent liquid 172 and the B-use translucent liquid 173, each having a refractive index, being equal or greater than 1.2 and equal or less than 1.9, there are fluorinated inactive liquid (refraction index: 1.25–1.5), ethylene glycol (refraction index: 1.43), a mixture of glycerin and ethylene glycol (refraction index: 1.45), etc. for example. Preferably, the refraction indexes of the R-use translucent liquid 171, the G-use translucent liquid 172 and the B-use translucent liquid 173 are selected to be nearly equal to the refraction indexes of the optical parts, which are in contact with those liquids, i.e., the R-use translucent liquid 171, the G-use translucent liquid 172 and the B-use translucent liquid 173, on the optical paths, such as, the R-use reflection-type liquid crystal panel 111, the G-use reflection-type liquid crystal panel 112 and the B-use reflection-type liquid crystal panel 113, and/or the R-use reflection-type polarization plate 101, the G-use reflection-type polarization plate 102 and the B-use reflection-type polarization plate 103, etc. Herein, the refraction index of an optical glass and/or an optical plastic, which are/is applied into the optical parts, lies about 1.4–1.5. Accordingly, the mixture of glycerin and ethylene glycol is suitable to be used as the R-use translucent liquid 171, the G-use translucent liquid 172 and the B-use translucent liquid 173, since the refraction index thereof is 1.45. However, it is needless to say that other(s) not listed up herein may be also applied therein, but as far as it/they satisfies the conditions mentioned above.

In this manner, since the refraction index of the R-use translucent liquid 171, the G-use translucent liquid 172 and the B-use translucent liquid 173 are selected to be nearly equal to the refraction index of the optical parts, therefore the difference in the refraction index is small upon the boundary surface between the R-use auxiliary polarizer 91 and the R-use translucent liquid 171, the boundary surface between the R-use reflection-type polarization plate 101 and the R-use translucent liquid 171, the boundary surface between the R-use reflection-type liquid crystal panel 111 and the R-use translucent liquid 171, the boundary surface between the R-use auxiliary analyzer 121 and the R-use translucent liquid 171, the boundary surface between the G-use auxiliary polarizer 92 and the G-use translucent liquid 172, the boundary surface between the G-use reflection-type polarization plates 102 and the G-use translucent liquid 172, the boundary surface between the G-use reflection-type liquid crystal panel 112 and the G-use translucent liquid 172, the boundary surface between the G-use auxiliary analyzer 122 and the G-use translucent liquid 172, the boundary surface between the B-use auxiliary polarizer 93 and the B-use translucent liquid 173, the boundary surface between the B-use reflection-type polarization plates 103 and the B-use translucent liquid 173, the boundary surface between the B-use reflection-type liquid crystal panel 113 and the B-use translucent liquid 173, and the boundary surface between the B-use auxiliary analyzer 123 and the B-use translucent liquid 173; therefore, reflection is hardly generated upon the each the boundary surface.

Figure 8:
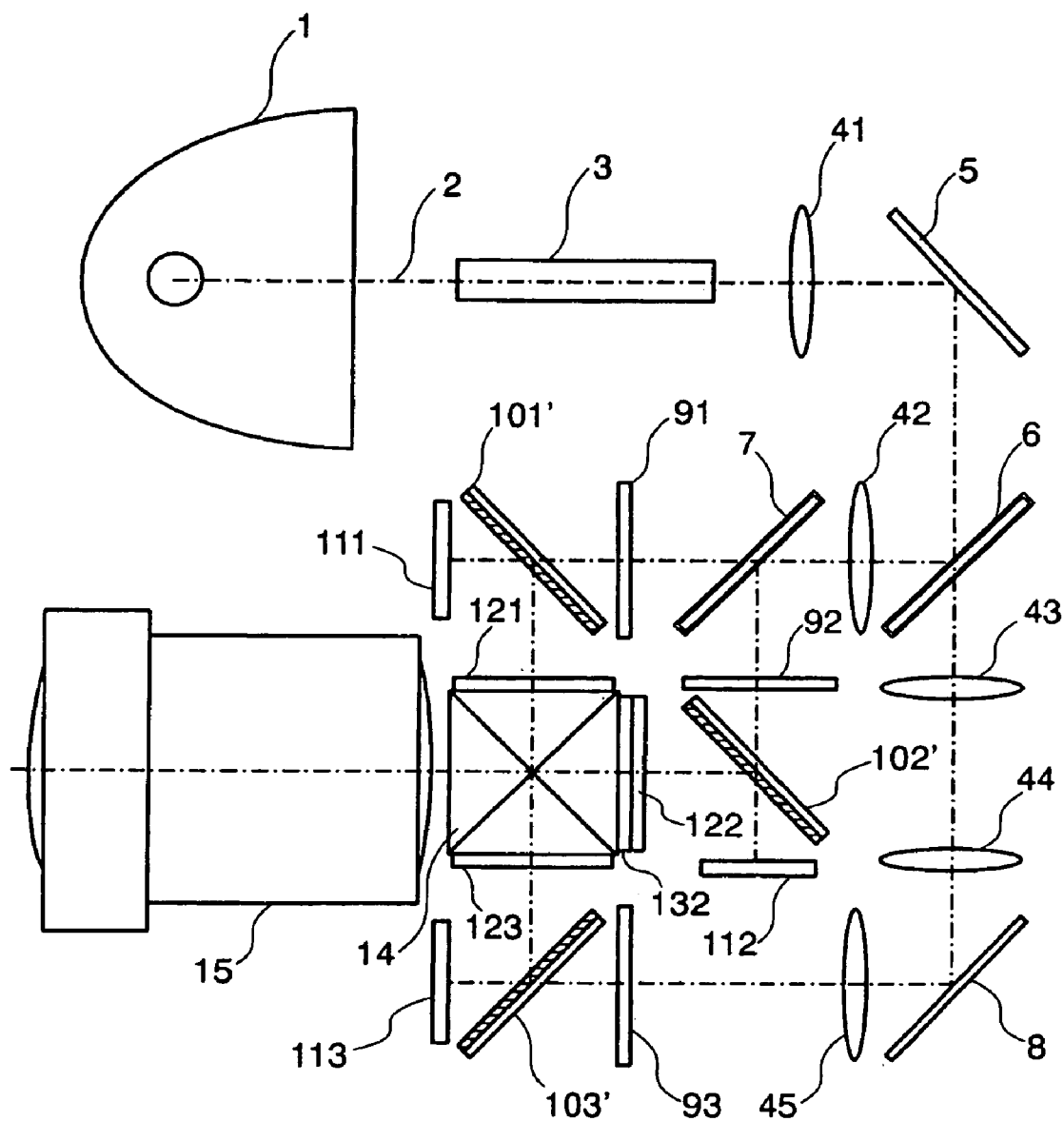
FIG. 8 is a plane view of the conventional optical unit.

In FIG. 8, since the optical parts mentioned above are in contact with the air having the refraction index "1", antireflection films are formed through evaporation process upon the boundary surfaces, so as to prevent the reflection upon those boundary surfaces; however, according to the present invention, since the reflection is hardly generated upon the boundary surfaces between the optical parts and the R-use translucent liquid 171, the G-use translucent liquid 172 and the B-use translucent liquid 173, there is no necessity of forming such the antireflection film thereupon. Accordingly, the evaporation process can be eliminated from the processing for forming such the antireflection film; therefore, it is possible to obtain a low cost of manufacturing the above-mentioned optical parts. And further, it is also possible to restrain the reduction of contrast due to such the reflection light, which is reflected upon the boundary surface.

Also, since the R-use reflection-type polarization plate 101, the G-use reflection-type polarization plate 102 and the B-use reflection-type polarization plate 103 are disposed within the R-use translucent liquid 171, the G-use translucent liquid 172 and the B-use translucent liquid 173, respectively, if the working surfaces (i.e., the hatching portions) of those are exposed, like the R-use reflection-type polarization plate 101', the G-use reflection-type polarization plate 102' and the B-use reflection-type polarization plate 103' shown in FIG. 8, there is a possibility that they are corroded by the R-use translucent liquid 171, the G-use translucent liquid 172 and the B-use translucent liquid 173. Accordingly, as was mentioned by referring to FIG. 1(*b*), the working surface (i.e., the hatching portion) $101_1$ is sandwiched with the transparent members $101_2$ while filling up the inside with the optical adhesive (not shown in the figure), so as to prevent the working surface from being exposed; thereby protecting it from the corrosion thereof. However, in that case, a part of the lights reflecting upon the R-use reflection-type liquid crystal panel 111, the G-use reflection-type liquid crystal panel 112 and the B-use reflection-type liquid crystal panel 113, i.e., the lights corresponding to the pixels, which are changed in the polarization upon the R-use reflection-type liquid crystal panel 111, the G-use reflection-type liquid crystal panel 112 and the B-use reflection-type liquid crystal panel 113, are reflected upon the R-use reflection-type polarization plate 101, the G-use reflection-type polarization plate 102 and the B-use reflection-type polarization plate 103, to be incident upon the R-use auxiliary analyzer 121, the G-use auxiliary analyzer 122 and the B-use auxiliary analyzer 123. At this instance, however the lights pass through the R-use reflection-type polarization plate 101, the G-use reflection-type polarization plate 102 and the B-use reflection-type polarization plate 103, both two (2) times when being incident and thereafter reflected thereupon; therefore, if they are disposed within the air, there is caused a problem of generating an astigmatism therein, due to the difference in the refraction index. However, according to the embodiment of the present invention, since the R-use reflection-type polarization plate 101, the G-use reflection-type polarization plate 102 and the B-use reflection-type polarization plate 103 are all disposed within the R-use translucent liquid 171, the G-use translucent liquid 172 and the B-use translucent liquid 173, the difference in the refraction index comes to be small, and therefore, such the astigmatism is hardly generated therein.

And, the R-use translucent liquid 171, the G-use translucent liquid 172 and the B-use translucent liquid 173 also function as a cooling medium. Within the R-use reflection-type liquid crystal panel 111, the G-use reflection-type liquid crystal panel 112 and the B-use reflection-type liquid crystal panel 113, part of heat that is generated due to the incident lights thereupon is transmitted to the R-use holding member 111', the G-use holding member 112' and the B-use holding member 113', respectively, which are provided at the rear surface sides thereof, to be discharged into an outside. Other large part of the heat is absorbed into the R-use translucent liquid 171, the G-use translucent liquid 172 and the B-use translucent liquid 173. With the R-use auxiliary polarizer 91, the G-use auxiliary polarizer 92 and the G-use auxiliary polarizer 93, and/or the R-use auxiliary analyzer 121, the G-use auxiliary analyzer 122 and the B-use auxiliary analyzer 123, if the polarization surfaces thereof are provided at the side of being in contact with the R-use translucent liquid 171, the G-use translucent liquid 172 and the B-use translucent liquid 173, it is possible to allow the R-use translucent liquid 171, the G-use translucent liquid 172 and the B-use translucent liquid 173 to absorb the large part of that heat. Further, with using the R-use reflection-type polarization plate 101, the G-use reflection-type polarization plate 102 and the B-use reflection-type polarization plate 103, in the similar manner, it is also possible to make those translucent liquids 171, 172 and 173 absorb a large part of the heat generated therein.

The heat absorbed into the R-use translucent liquid 171, the G-use translucent liquid 172 and the B-use translucent liquid 173 moves through the free convection thereof, within the R-use optical chassis 161, the G-use optical chassis 162 and the B-use optical chassis 163, conducting to interior wall surfaces of the R-use optical chassis 161, the G-use optical chassis 162 and the B-use optical chassis 163, respectively, is discharged into an outside thereof. Accordingly, the R-use optical chassis 161, the G-use optical chassis 162 and the B-use optical chassis 163 are preferably made of a metal, such as, Fe, Cu, Al, Mg, etc., and an alloy thereof, or a material including them, being superior of heat conductivity, so as to prompt or accelerate heat radiation therefrom into the outside. Also, with provision of heat radiation fins 18 on an outer wall of the R-use optical chassis 161, the G-use optical chassis 162 and the B-use optical chassis 163, it is possible to increase an efficiency of the heat radiation. Thus, there is no need of provision of a cooling fan, though conventionally necessary thereof; therefore, it is possible to achieve a low noise cooling without noises generated due to such the cooling fan.

Further, without using such the heat radiation fins 18, but through compulsive cooling of the outer walls of the R-use optical chassis 161, the G-use optical chassis 162 and the B-use optical chassis 163, directly by means of, such as, a cooling fan (not shown in the figure), it is also possible to increase the efficiency of heat radiation. On this case, it is enough to apply a cooling fan, being small in the size comparing to the conventional one; therefore, it is also possible to achieve the lowering of noises. And, with provision of the heat radiation fins 18 on the outer walls of the R-use optical chassis 161, the G-use optical chassis 162 and the B-use optical chassis 163, and further through the compulsive cooling by means of the cooling fan, it is possible to increase the effect of heat radiation, further.

Also, within the R-use reflection-type liquid crystal panel 111, the G-use reflection-type liquid crystal panel 112 and the B-use reflection-type liquid crystal panel 113, if the heat generated therein is absorbed into the R-use translucent liquid 171, the G-use translucent liquid 172 and the B-use translucent liquid 173, and if the R-use holding member 111', the G-use holding member 112' and the B-use holding member 113', being provided on the rear surfaces thereof, are made of a metal, such as, Fe, Cu, Al, Mg, etc., and an alloy thereof, or a material including them, being superior of heat conductivity, then the increase of temperature upon the liquid crystal surfaces can be suppressed down to be low, comparing to the conventional art; therefore, it is possible to reduce the generation of the shift of convergence due to heat expansions of the R-use holding member 111', the G-use holding member 112' and the B-use holding member 113' of the R-use reflection-type liquid crystal panel 111, the G-use reflection-type liquid crystal panel 112 and the B-use reflection-type liquid crystal panel 113. Compulsive cooling of the R-use holding member 111', the G-use holding member 112' and the B-use holding member 113' by means of the cooling fan is much effective, further.

Further, an amount of heat energy generated differs, depending upon the wavelength band thereof (i.e., each color); therefore, volumes of the R-use optical chassis 161, the G-use optical chassis 162 and the B-use optical chassis 163 may be different from one another, in proportion to the amount of heat energy generated therein, thereby achieving further effective cooling.

Also, lifetimes of the R-use reflection-type liquid crystal panel 111, the G-use reflection-type liquid crystal panel 112 and the B-use reflection-type liquid crystal panel 113 is in reverse proportion to the temperature of the liquid crystal portion when operating; therefore, with such the structures as was mentioned above, it is also possible to lower the temperature of the liquid crystal portion when operating, comparing to the conventional art, as well as, long lifetimes of the R-use reflection-type liquid crystal panel 111, the G-use reflection-type liquid crystal panel 112 and the B-use reflection-type liquid crystal panel 113.

Herein, since the optical unit, but except for the projection lens, is almost same to that of the optical unit shown in FIG. 8, and therefore it is needless to say that preferable contrast performances can be obtained.

Next, explanation will be made on a second embodiment according to the present invention.

Figure 4:
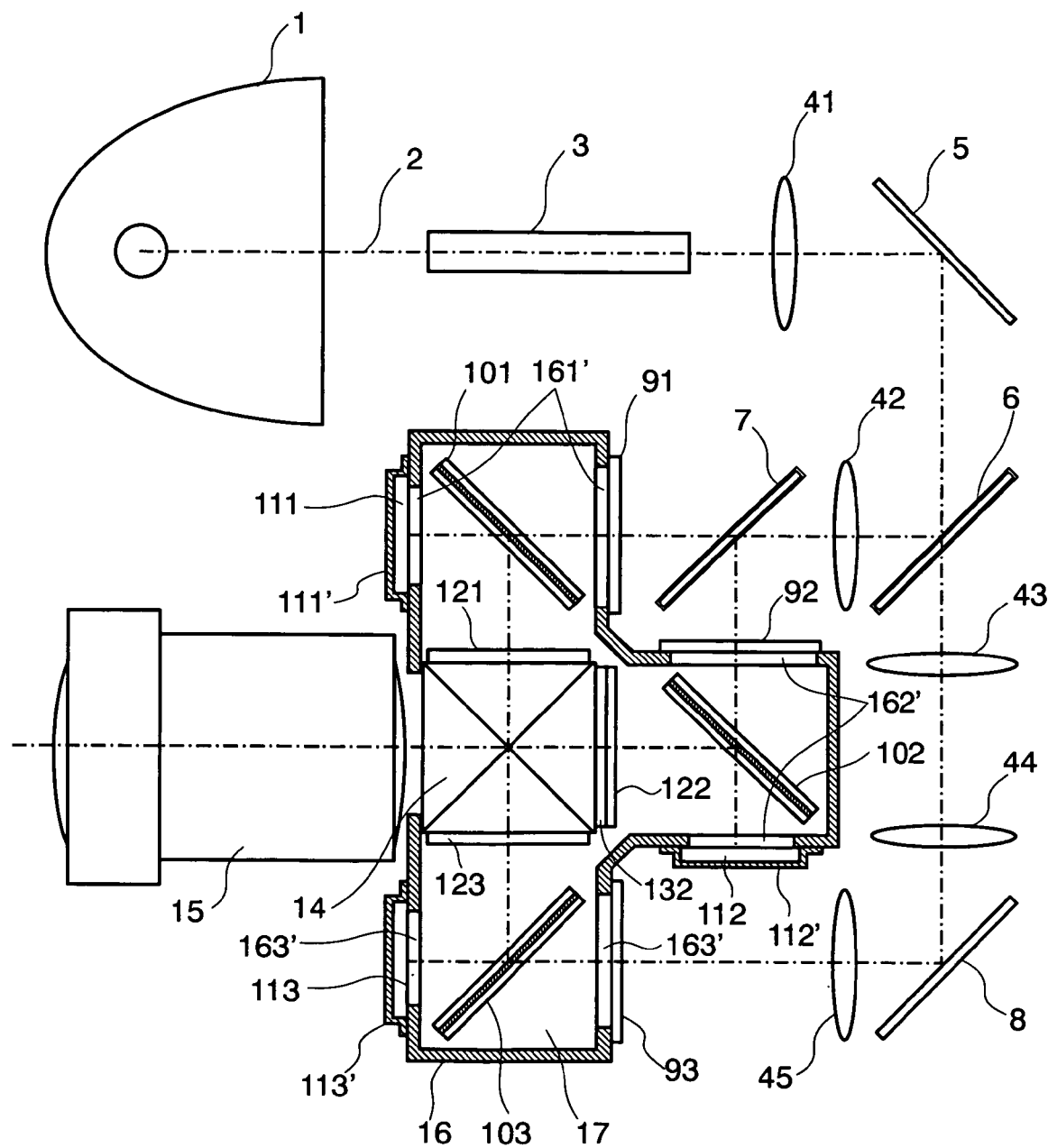
FIG. 4 is a plane view of an optical unit according to a second embodiment of the present invention.

FIG. 4 is a view for showing the optical unit according to the second embodiment of the present invention. In this FIG. 4, a reference numeral 16 depicts the optical chassis, and 17 the translucent liquid. However, in this FIG. 4, the elements having the functions same or similar to those shown in FIGS. 1(a) and 1(b) are attached with the same numeral references, and the explanation thereof is omitted herein. And, since the arrangement of the optical parts in this figure is also same to that of the first embodiment shown in FIGS. 1(a) and 1(b), and therefore the optical performances obtained therefrom are same to those; thereby omitting the explanation thereof. The description will not be made on effects thereof, but only new ones.

With this second embodiment according to the present invention, as is shown in FIG. 4, although being same to the first embodiment shown in FIGS. 1(a) and 1(b), in the arrangement of the optical parts thereof, but it is characterized that the optical chassis is constructed into a one (1) body, or as an unit, as the optical chassis 16, though being separated into R, G and B-blocks, i.e., the R-use optical chassis 161, the G-use optical chassis 162 and the B-use optical chassis 163, in the first embodiment shown in FIGS. 1(a) and 1(b). Accordingly, the hermetically sealed spaces, which are built up with the optical chassis 16, the reflection-type liquid crystal panels 111, 112 and 113, the auxiliary polarizers 91, 92 and 93, the auxiliary analyzers 121, 122 and 123, and the cross dichroic prism 14 attached with the G-use ½ wavelength plate 132, etc., are also made into one body in the structure; therefore, the translucent liquid 17 filled up therein can move or migrate between each of the R, G and B-blocks.

With such the structure, further, the translucent liquid 17 can circulate by the convection within the hermetically sealed space in the optical chassis 16, while obtaining the same effect of the first embodiment; therefore, it is possible to disperse the heat generated, uniformly, thereby increasing the efficiency of cooling. Also, with provision of the heat radiation fins 18 on the outer wall of the optical chassis 16, and/or through conducting the compulsive cooling by means of the cooling fan (not shown in the figure), it is needless to say, but the efficiency of cooling can be increased, further.

Although the optical chassis of R, G and B-blocks are constructed into one (1) body, so as to define only the one space hermetically sealed, in the above explanation, however; the present invention should not be restricted only to that. For example, only the chassis of R and G-blocks neighboring with each other may be constructed into one (1) body, thereby to define the only one space hermetically sealed with the R and G-blocks. Also, it is needless to say, but the volumes may differ from one another, of the spaces of the R, G and B-blocks, which define the one space hermetically sealed, in the above.

Next, explanation will be made about a third embodiment according to the present invention.

Figure 5:
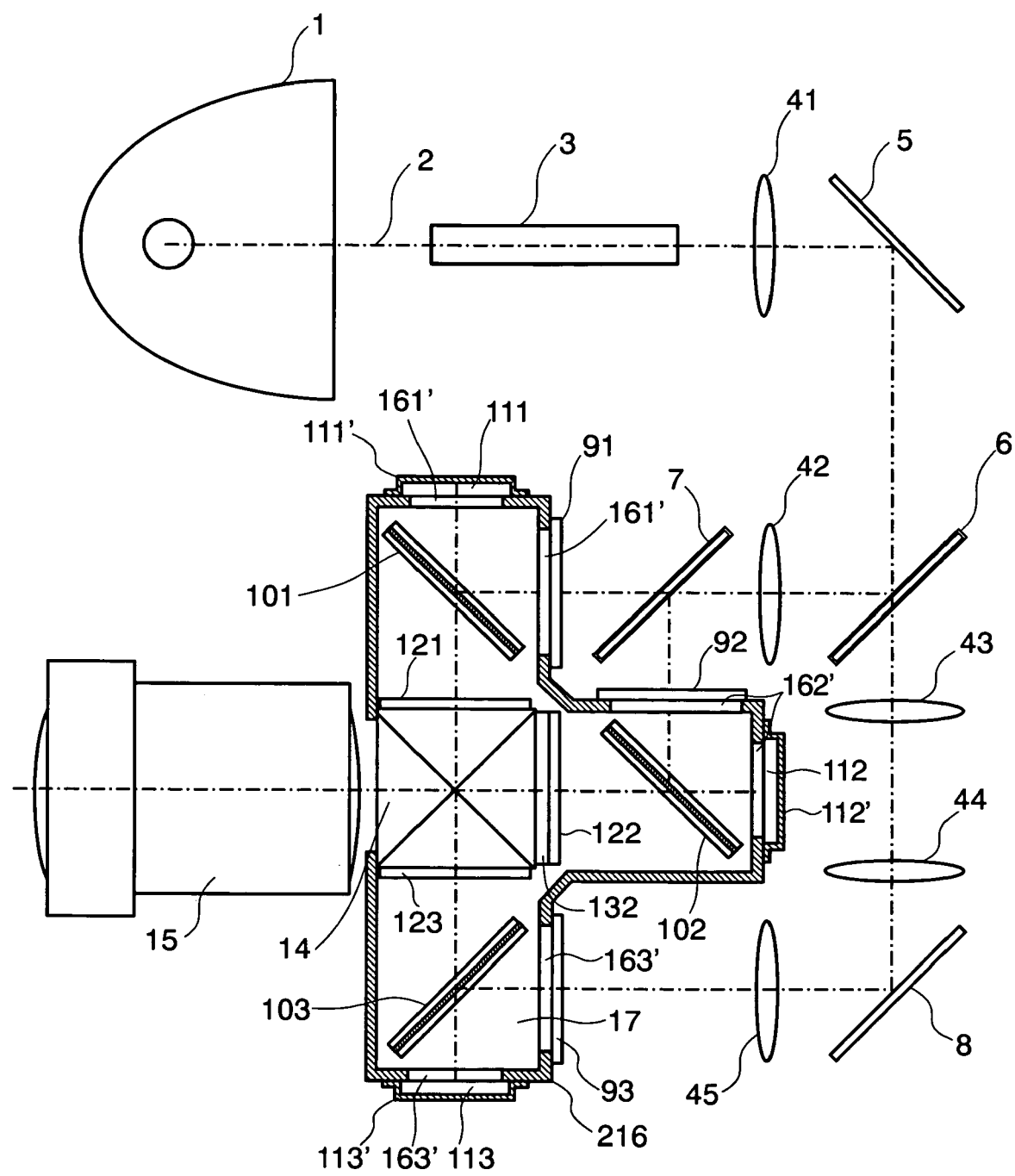
FIG. 5 is a plane view of an optical unit, according to a third embodiment of the present invention.

FIG. 5 is a view for showing the optical unit according to the third embodiment of the present invention. In this FIG. 5, a reference numeral 216 depicts an optical chassis. However, the elements having the functions same or similar to those shown in FIGS. 1(a) and 1(b) are attached with the same numeral references, and the explanation thereof is omitted herein.

With this third embodiment, as shown in FIG. 5, changes are made on the arrangement of the R-use reflection-type liquid crystal panel 111, the G-use reflection-type liquid crystal panel 112 and the B-use reflection-type liquid crystal panel 113 in the second embodiment, so that they are in parallel with an incident surface of the cross dichroic prism, upon which the reflection light reflected upon each the liquid crystal panel is incident. Accordingly, differing from the first and second embodiments mentioned above, reflection axes of the reflection-type polarization plates 101, 102 and 103 are so set up, that the incident lights polarized into a predetermined direction (for example, the P-polarization) are reflected thereupon, to be directed to the R-use reflection-type liquid crystal panel 111, the G-use reflection-type liquid crystal panel 112 and the B-use reflection-type liquid crystal panel 113. Also, the R-use auxiliary analyzer 121, the G-use auxiliary analyzer 122 and the B-use auxiliary analyzer 123 are so arranged, that the absorption axes thereof are in nearly parallel to the reflection axes of the reflection-type polarization plates 101, 102 and 103, respectively.

In the present embodiment, since having such the structure as was mentioned above, the passages 161' (the passage of the R-use reflection-type liquid crystal panel 111 and the passage of the R-use auxiliary polarizer 91, as being the light inlet/outlet openings of the optical chassis 216) are not opposite to each other, but perpendicular to. In the same manner, the passages 162' and 163' are also perpendicular to each other.

In FIG. 5, the respective optical paths for the R, G and B-lights, up to the R-use auxiliary polarizer 91, the B-use auxiliary polarizer 92 and the R-use auxiliary polarizer 93, are same to those in the optical units of the first and second embodiments mentioned above.

The R-light incident upon the R-use auxiliary polarizer 91, since the light (herein the P-polarization light, for example) is perpendicular to the absorption axis or the reflection axis of the R-use auxiliary polarizer 91, in the polarization direction thereof, it penetrates through the R-use auxiliary polarizer 91, to be incident upon the R-use reflection-type polarization plate 101. Since the R-use reflection-type polarization plate 101, applying the diffraction grating therein, is so disposed that the reflection axis parallel to the grating direction is in nearly perpendicular to the absorption axis or the reflection axis of the R-use auxiliary polarizer 91 (but, being parallel in the first and second embodiments), then the light incident upon the R-use reflection-type polarization plate 101 is reflected thereupon and bent by 90° in the light direction thereof, to be incident upon the R-use reflection-type liquid crystal panel 111.

With the G-light incident upon the G-use auxiliary polarizer 92, in the similar manner of the R-light, portion of the light (herein, the P-polarization light) being perpendicular to the absorption axis or the reflection axis of: the G-use auxiliary polarizer 92, in the polarization direction thereof, penetrates through the G-use auxiliary polarizer 92, to be incident upon the G-use reflection-type polarization plate 102. Since the G-use reflection-type polarization plate 102, applying the diffraction grating therein, is so disposed that the reflection axis parallel to the grating direction is in nearly perpendicular to the absorption axis or the reflection axis of the G-use auxiliary polarizer 92, then the light incident upon the G-use reflection-type polarization plate 102 is reflected upon and bent by 90° in the light direction thereof, to be incident upon the G-use reflection-type liquid crystal panel 112.

In the similar manner of the R and G-lights, also the B-light incident upon the B-use auxiliary polarizer 93, part of the light (herein, the P-polarization light) being perpendicular to the absorption axis or the reflection axis of the B-use auxiliary polarizer 93, in the polarization direction thereof, penetrates through the B-use auxiliary polarizer 93, to be incident upon the B-use reflection-type polarization plate 103. Since the B-use reflection-type polarization plate 103, applying the diffraction grating therein, is so disposed that the reflection axis parallel to the grating direction is in nearly perpendicular to the absorption axis or the reflection axis of the B-use auxiliary polarizer 93, then the light incident upon the B-use reflection-type polarization plate 103 is reflected upon and bent by 90° in the light direction thereof, to be incident upon the B-use reflection-type liquid crystal panel 113.

The lights incident upon the R-use reflection-type liquid crystal panel 111, the G-use reflection-type liquid crystal panel 112 and the B-use reflection-type liquid crystal panel 113 are rotated by an angle, 90° in the polarization direction thereof, respectively, when being reflected upon surface of the pixels displaying a white image on the R-use reflection-type liquid crystal panel 111, the G-use reflection-type liquid crystal panel 112 and the B-use reflection-type liquid crystal panel 113, i.e., into the S-polarization light, thereby to be incident upon the R-use reflection-type polarization plate 101, the G-use reflection-type polarization plate 102 and the B-use reflection-type polarization plate 103. In this instance, since the incident lights are the S-polarization lights being perpendicular to the reflection axis, they can penetrate through the R-use reflection-type polarization plate 101, the G-use reflection-type polarization plate 102 and the B-use reflection-type polarization plate 103, and are incident upon the R-use auxiliary analyzer 121, the G-use auxiliary analyzer 122 and the B-use auxiliary analyzer 123, respectively. Since the absorption axes of the R-use auxiliary analyzer 121, the G-use auxiliary analyzer 122 and the B-use auxiliary analyzer 123 are so disposed, that they are in nearly parallel to the reflection axes of the R-use reflection-type polarization plate 101, the G-use reflection-type polarization plate 102 and the B-use reflection-type polarization plate 103, then the lights penetrating through the R-use reflection-type polarization plate 101, the G-use reflection-type polarization plate 102 and the B-use reflection-type polarization plate 103 also penetrate through the R-use auxiliary analyzer 121, the G-use auxiliary analyzer 122 and the B-use auxiliary analyzer 123, respectively. Thereafter, the R and B-lights pass through the G-use ½ wavelength plate 132, as is of the S-polarization light, while the G-light passes therethrough to be the P-polarization light, and then all the R, G and B-lights are incident upon the cross dichroic prism 14. Those R, G and B-lights are composed or synthesized within the dichroic prism 14, and are projected through the projection lens 15 onto a screen (not shown in the figure), enlargedly.

Also, the lights reflected upon the R-use reflection-type liquid crystal panel 111, the G-use reflection-type liquid crystal panel 112 and the B-use reflection-type liquid crystal panel 113, portion of the lights corresponding to the pixels, which are changed in the polarization thereof through the R-use reflection-type liquid crystal panel 111, the G-use reflection-type liquid crystal panel 112 and the B-use reflection-type liquid crystal panel 113, can penetrate through the R-use reflection-type polarization plate 101, the G-use reflection-type polarization plate 102 and the B-use reflection-type polarization plate 103, to be incident upon the R-use auxiliary analyzer 121, the G-use auxiliary analyzer 122 and the B-use auxiliary analyzer 123. In this instance, those lights penetrate through the glass portions of the R-use reflection-type polarization plate 101, the G-use reflection-type polarization plate 102 and the B-use reflection-type polarization plate 103, two (2) times at when being incident upon and exiting from the surfaces thereof, but since the R-use reflection-type polarization plate 101, the G-use reflection-type polarization plate 102 and the B-use reflection-type polarization plate 103 are disposed within the translucent liquid 17, the difference in the refraction index is small; therefore, an astigmatism is hardly generated therein.

With such the structure as was motioned above, the R-use reflection-type liquid crystal panel 111 and the B-use reflection-type liquid crystal panel 113 can be disposed at positions separating from the projection lens 15; therefore, there can be obtain an effect of increasing the degree of freedom on the structures of the holding members 111' and 113'and the adjusting mechanisms thereof (not shown in the figure). Further, since the image lights, penetrating through the R-use reflection-type polarization plate 101, the G-use reflection-type polarization plate 102 and the B-use reflection-type polarization plate 103, are incident upon the R-use auxiliary analyzer 121, the G-use auxiliary analyzer 122 and the B-use auxiliary analyzer 123; therefore, it is possible to lessen the convergence shift, which is caused by an angular change of disposition and/or deformation of the reflection-type polarization plates 101, 102 and 103, comparing to the case where the image lights are incident upon the R-use auxiliary analyzer 121, the G-use auxiliary analyzer 122 and the B-use auxiliary analyzer 123 after being reflected upon R-use reflection-type polarization plate 101, the G-use reflection-type polarization plate 102 and the B-use reflection-type polarization plate 103.

Herein, thought the hermetically sealed space is built up with the optical chassis 216, which is constructed in one body, in the third embodiment shown in FIG. 5; however, as the first embodiment shown in FIGS. 1(*a*) and 1(*b*) in the above, the R-use optical chassis, the G-use optical chassis and the B-use optical chassis may be separated from one another in the structure thereof. And, also regarding the G-light, in the similar manner to the R and B-lights, the light reflecting upon the G-use reflection-type liquid crystal panel 112 penetrates thought the G-use reflection-type polarization plate 102, in the structure according to the third embodiment shown in FIG. 5, however, it may be constructed so that only the G-light, reflection upon the G-use reflection-type liquid crystal panel 112 is reflected upon the G-use reflection-type polarization plate 102, as is in the structures of the first and second embodiments. Also, in that third embodiment shown in FIG. 5, the reflection axes of the reflection-type polarization plates 101, 102 and 103 are directed in the structures thereof, so as to reflect the P-polarization light, while penetrating the S-polarization light therethrough, but on the contrary to that, it may be constructed in such the direction, as being able to reflect the S-polarization light while penetrating the P-polarization light therethrough, in the similar manner to those of the first and second embodiments mentioned above. In this case, however, the light emitting from the rod lens is rotated into the S-polarization light to the reflection-type polarization plates 101, 102 and 103, while the auxiliary polarizers 91, 92 and 93 are directed into the absorption axis for penetrating the S-polarization light therethrough, or into the direction of the reflection axis, and the auxiliary analyzers 121, 122 and 123 into the absorption axis for penetrating the P-polarization light therethrough. And further, the R-use ½ wavelength plate is inserted between the R-use auxiliary analyzer and the cross dichroic prism 14 while inserting the B-use ½ wavelength plate between the B-use auxiliary polarizer and the cross dichroic prism 14, and then the G-use ½ wavelength plate is deleted from.

However, the explanation was made that the auxiliary polarizers are disposed at the incident side of the reflection-type polarization plates while the auxiliary analyzers at the exit side thereof in the above, however in a case where the penetration/reflection characteristics of the reflection-type polarization plates is enough to fully maintain the contrast thereof, it is needless to say that the auxiliary polarizers and the auxiliary analyzers can be removed therefrom. In such the case, however, the positions where the auxiliary polarizers are provided may be changed to the positions of the translucent windows. Since the auxiliary analyzers were attached on the cross dichroic prism in the above, therefore, it means only that they are deleted from it.

Figure 6:
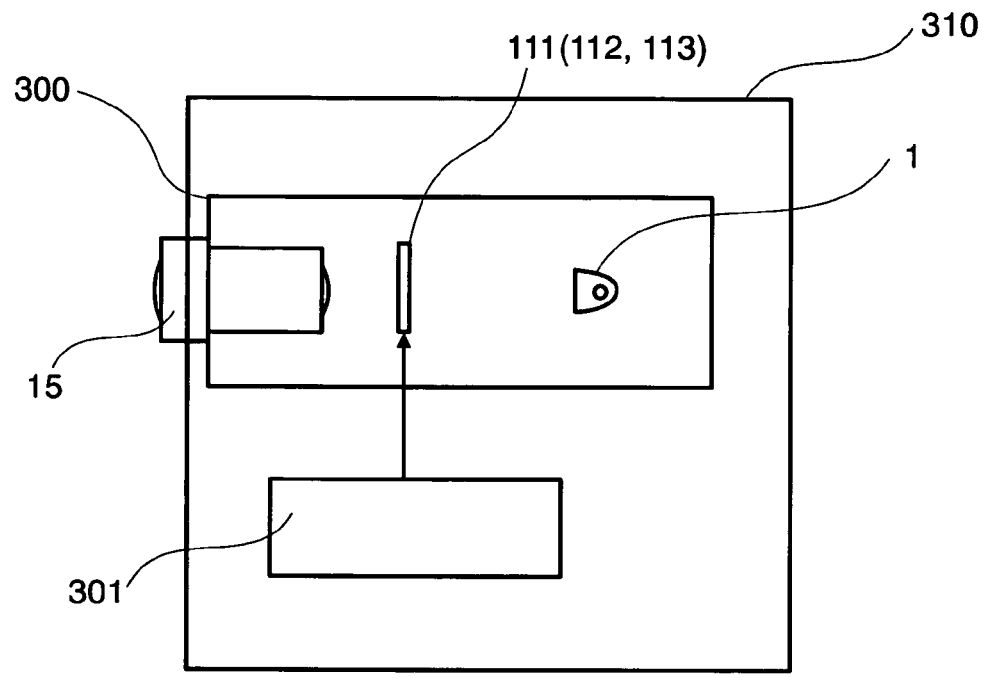
FIG. 6 is a block diagram of a projector apparatus, which installs the optical unit therein, as an embodiment according to the present invention.

FIG. 6 is a block diagram of a projector apparatus installing the above-mentioned optical unit therein, according to the embodiment of the present invention. In this FIG. 6, the elements having the functions same or similar to those shown in FIGS. 1(*a*) and 1(*b*), 4 and 5 are also shown by attached the same references therewith.

In FIG. 6, the projector apparatus 310 is built up with the optical unit 300, according to the embodiment of the present invention mentioned above, and a display drive circuit 301 for conducting display driving, so that an optical image can be formed on the liquid crystal panels. Hereinafter, the projector apparatus 310 will be mentioned, in particular, about the functions thereof.

In FIG. 6, a light from a light source 1 is aligned into a predetermined polarization light through a polarization conversion element not shown in the figure (such as, a rod lens 3 shown in FIG. 1(*a*), for example), and is separated into the R, G and B-lights by means of a color separation means (such as, the dichroic mirrors 6 and 7 shown in FIG. 1(*a*), for example), to be incident upon the reflection-type liquid crystal panels 111 (112, 113). Upon the reflection-type liquid crystal panels 111 (112, 113), the polarization direction of a predetermined polarization light is changed for each of colors, depending upon the picture signal from the display drive circuit 301, so as to perform the light intensity modulation for changing the each color into gradation; thereby, forming the optical image. The said optical images of the respective colors are synthesized within a color synthesizing means (such as, the cross dichroic prism 14 shown in FIG. 1(*a*), for example), and are enlarged through the projection lens 15, to be projected.

Figure 7:
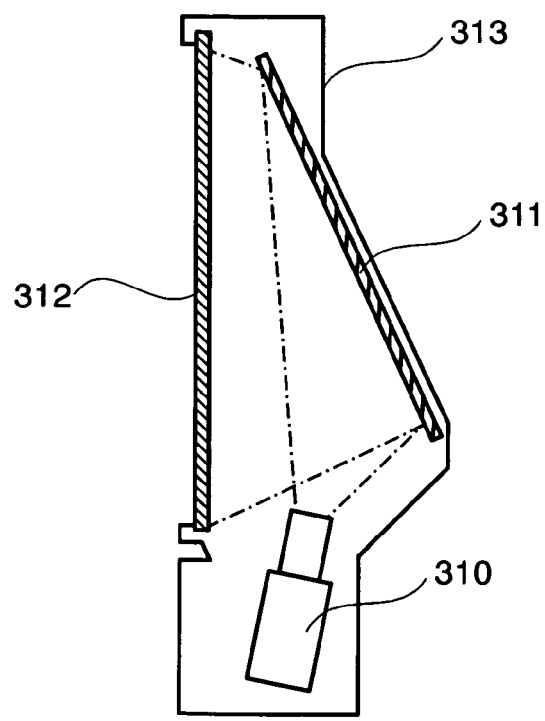
FIG. 7 shows an embodiment applying the projector apparatus, which installs the optical unit of the present invention therein, into a rear surface projection-type image display apparatus, in particular.

FIG. 7 shows an embodiment of applying the projector apparatus mentioned above, in particular, into a rear-surface projection-type image display apparatus; i.e., one embodiment among the projection-type image display apparatuses, and it is a brief cross-section view seen from a side surface thereof. In FIG. 7, the projection image light from the projector apparatus 310 is turned back to the direction of a screen 312 on the light path, by means of a rear-surface mirror 311, and it is projected onto the screen 312 from the rear-side surface thereof. Further, a reference numeral 313 depicts a housing of the rear-surface projection-type image display apparatus.

As was fully explained in the above, according to the present invention, the panel surfaces of the reflection-type liquid crystal panels, the reflection-type polarization plates, the auxiliary analyzers, the auxiliary polarizers, and the cross dichroic prism are provided or disposed within an inside of the optical chassis, in the structure thereof. With this, disposing the optical parts within the space that is hermetically sealed up, it enables to prevent dust from invading inside from an outside, and then no dust adheres upon the surface of the optical parts.

Further, the translucent liquid having the refraction index, being equal or greater than 1.2 and being equal or less than 1.9, is filled up within an inside of the space hermetically sealed, in the structure. With this, since the optical path from the reflection-type liquid crystal panel through the reflection-type polarization plate up to the auxiliary analyzer lies within the translucent liquid mentioned above, then the optical path comes to be small; i.e., (the optical length)=(the optical length in case of the air of FIG. 8)/(refraction index of the translucent liquid). Accordingly, the back focus comes to be small comparing to the case of the air shown in FIG. 8, and therefore it is possible to make the projection lens small in the size thereof.

And, since the translucent liquid also functions as the cooling medium, therefore it is possible to suppress the increase of temperature on the reflection-type liquid crystal panels; thereby enabling to restrain the convergence shift of the holding members thereof due to the thermal expansion thereof.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

INDUSTRIAL APPLICABILITY

According to the present invention, it is possible to achieve the projection-type image display apparatus, being small in the size and light in the weight thereof.

What is claimed is:

1. An optical unit, comprising:
   a light source;
   a color separation means for separating a light emitted from said light source into plural pieces of color lights;
   reflection-type image display elements, upon each being incident the corresponding color of the lights from said color separation means, and for forming an optical image for each of said color lights, depending upon an image signal, with using polarization characteristics which said reflection-type image display elements have; and
   a color synthesizing means for synthesizing said optical images of said respective color lights, to be projected through a projection lens, enlargedly, and further comprising:
   a reflection-type polarization plate functioning as a polarization plate due to diffraction, being provided on an optical path extending from said color separation means to said reflection-type image display elements, to be a polarizer and an analyzer to said reflection-type image display elements; and
   an optical chassis for holding said reflection-type polarization plate and said reflection-type image display elements thereon, and having a translucent window on an incident light side of said reflection-type polarization plate while an exiting light side of said reflection-type polarization plate is sealed with an incident surface of said color synthesizing means, wherein
   a hermetically sealed space is defined by said optical chassis, said reflection-type image display elements and the incident surface of said color synthesizing means, and within said hermetically sealed space is disposed a translucent liquid having refraction index from 1.2 to 1.9.

2. An optical unit, comprising:
   a light source;
   a color separation means for separating a light emitted from said light source into plural pieces of color lights;
   reflection-type image display elements, upon each being incident the corresponding color of the lights from said color separation means, and for forming an optical image for each of said color lights, depending upon an image signal, with using polarization characteristics which said reflection-type image display elements have; and
   a color synthesizing means for synthesizing said optical images of said respective color lights, to be projected through a projection lens, enlargedly, and further comprising:
   a reflection-type polarization plate functioning as a polarization plate due to diffraction, being provided on an optical path extending from said color separation means to said reflection-type image display elements, to be a polarizer and an analyzer to said reflection-type image display elements; and
   an optical chassis for holding said reflection-type polarization plate thereon, and having translucent windows on an incident light side and an incident/exiting light side of said reflection-type polarization plate while an exiting light side of said reflection-type polarization plate is sealed with an incident surface of said color synthesizing means, wherein
   a hermetically sealed space is defined by said optical chassis, said reflection-type image display elements and the incident surface of said color synthesizing means, and within said hermetically sealed space is disposed a translucent liquid having refraction index from 1.2 to 1.9.

3. The optical unit, as described in the claim 2, wherein an auxiliary polarizer is disposed on said incident light side translucent window of said optical chassis, while said reflection-type image display elements are disposed on said incident/exiting light side translucent window of said optical chassis.

4. The optical unit, as described in the claim 1, wherein an auxiliary polarizer is disposed on said optical chassis in place of said incident light side translucent window.

5. The optical unit, as described in the claim 1, wherein an auxiliary polarizer is disposed on said optical chassis in place of said incident light side translucent window.

6. A projection-type image display apparatus, comprising:
   an optical unit as described in the claim 1; and
   a driver circuit for driving said reflection-type image display elements.

7. A projection-type image display apparatus, comprising:
   an optical unit as described in the claim 2; and
   a driver circuit for driving said reflection-type image display elements.

8. A projection-type image display apparatus, comprising:
   an optical unit as described in the claim 3; and
   a driver circuit for driving said reflection-type image display elements.

* * * * *